United States Patent [19]

Greene

[11] 4,268,094

[45] * May 19, 1981

[54] RADIAL AND THRUST-TYPE HYDRODYNAMIC BEARING CAPABLE OF ACCOMMODATING MISALIGNMENT

[76] Inventor: Jerome Greene, 1608 Comanche Rd., Arnold, Md. 21012

[*] Notice: The portion of the term of this patent subsequent to Jan. 6, 1993, has been disclaimed.

[21] Appl. No.: 62,030

[22] Filed: Jul. 30, 1979

Related U.S. Application Data

[63] Continuation of Ser. No. 757,323, Jan. 6, 1977, abandoned.

[51] Int. Cl.³ .......................... F16C 7/04; F16C 17/03; F16C 17/06; F16C 27/06
[52] U.S. Cl. .......................................... 308/9; 308/26; 308/72; 308/73; 308/160
[58] Field of Search .................. 308/9, 26, 28, 29, 35, 308/72, 73, 121, 160, 161, 162

[56] References Cited

U.S. PATENT DOCUMENTS

| | | | |
|---|---|---|---|
| 1,882,102 | 10/1932 | Wallgren | 308/160 |
| 2,137,487 | 11/1938 | Hall | 308/73 |
| 2,250,546 | 7/1941 | Michell et al. | 308/160 |
| 2,498,011 | 2/1950 | Sherbondy | 308/73 |
| 3,131,004 | 4/1964 | Sternlicht | 308/73 |
| 3,679,197 | 7/1972 | Schmidt | 308/26 |
| 3,930,691 | 1/1976 | Greene | 308/160 |

*Primary Examiner*—Charles E. Frankfort
*Attorney, Agent, or Firm*—Bacon & Thomas

[57] ABSTRACT

A hydrodynamic bearing capable of transmitting thrust and radial loads and able to accommodate angular misalignment between an inner load applying or supporting member rotatably connected to the bearing utilizes an outer cylindrical array of bearing pads disposed about a longitudinal axis, the pads having movable face portions with spherically curved bearing surfaces having a common center of curvature located on the longitudinal axis, the curved surfaces mating with a spherically curved periphery on the load supporting member. The face portions of the bearing pads are supported by curved laminated elastomer-inelastic material so that they are restricted to swinging motion about "swing points" located between the axis of rotation of the bearing and the face portions thereof under the combined influences of friction and load forces exerted thereagainst by the load applying or supporting member, so that wedge-shaped hydrodynamic gaps are created between the relatively moving bearing surfaces that are filled by the lubricant to maintain the surfaces apart while the motion is occurring through hydrodynamic action. Radial and thrust loads, as well as angular misalignment between the load supporting member and the bearing pads, are all accommodated by reason of the particular ball and socket relationship between the bearing members, without adversely affecting the hydrodynamic action of the bearing.

5 Claims, 4 Drawing Figures

U.S. Patent     May 19, 1981     4,268,094
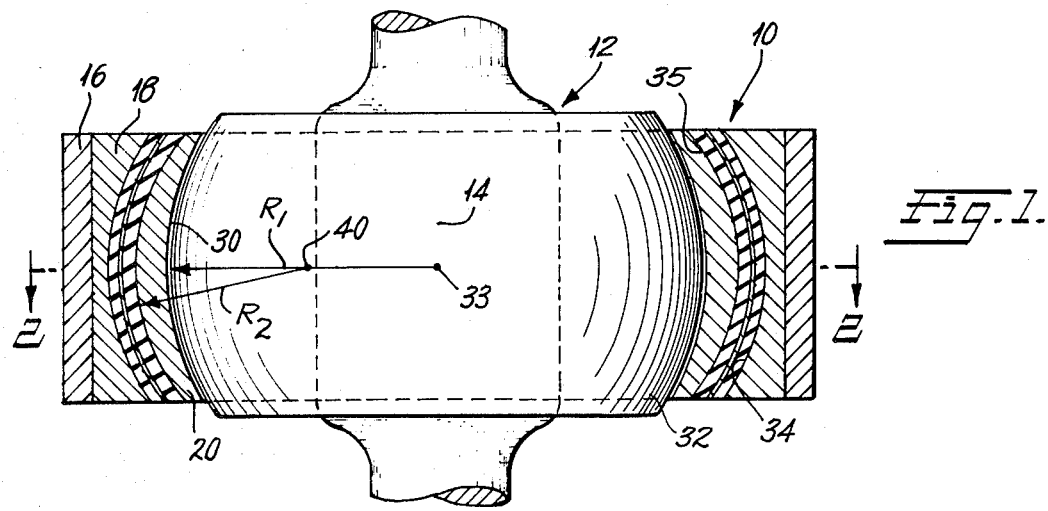
Fig. 1.
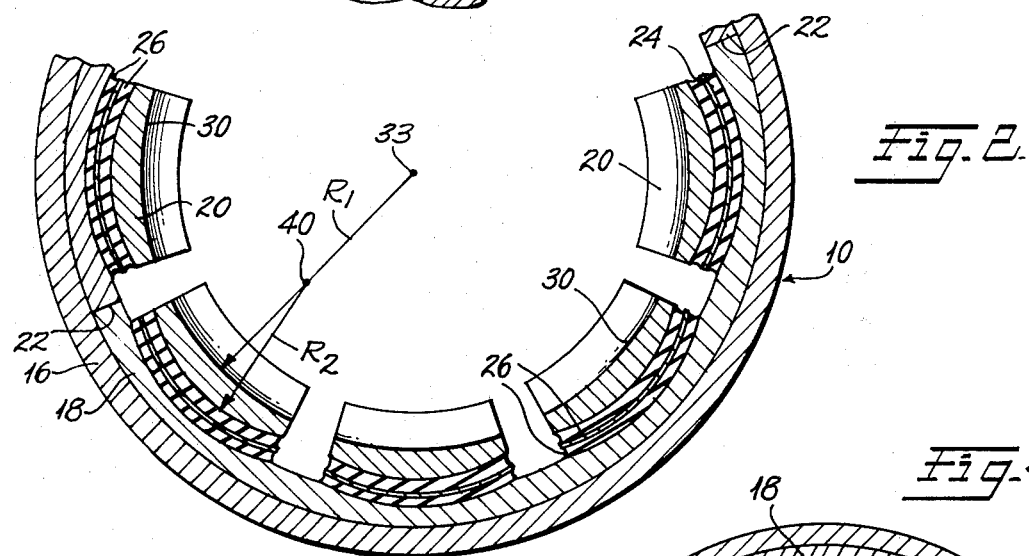
Fig. 2.
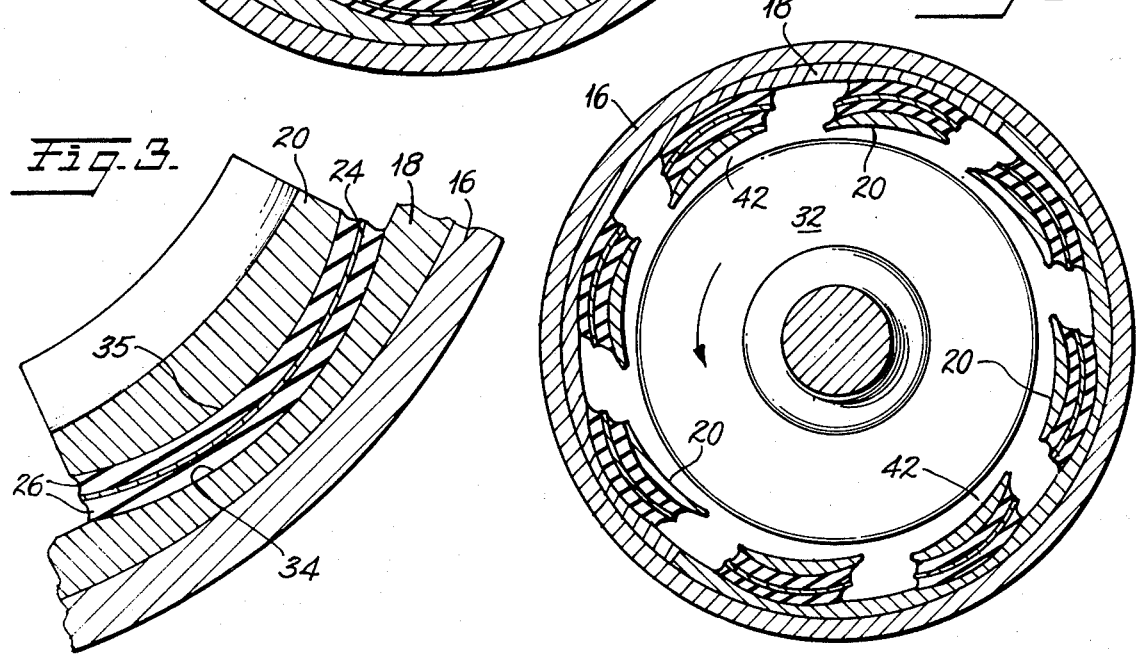
Fig. 3.
Fig. 4.

RADIAL AND THRUST-TYPE HYDRODYNAMIC BEARING CAPABLE OF ACCOMMODATING MISALIGNMENT

This is a continuation of Application Ser. No. 757,323, filed Jan. 6, 1977, now abandoned.

BACKGROUND OF THE INVENTION

This invention relates to the field of hydrodynamic bearings, and proposes to solve a problem in prior art combined radial and thrust-type bearings using compound curved surfaces, particularly spherically curved bearing surfaces. In addition to being able to handle both radial and thrust loads, the bearing constructed in accordance with the present invention can accommodate angular misalignment between the rotational axis of the moving part of the bearing and the axis of the fixed part of the bearing.

The bearing of the present invention is related to the invention disclosed in U.S. Pat. No. 3,930,691 issued Jan. 6, 1976 entitled "SWING PAD BEARING".

In essence, that patent discloses a hydrodynamic bearing pad including a movable face portion that is adjacent to a relatively movable load applying or supporting surface in the presence of a lubricant, the face portion of the bearing pad being mounted for swinging motion relative to a base element underlying the surface portion about a swinging axis or center located toward the relatively movable load applying or supporting surface and away from the face portion of the bearing pad to enable generation of the lubricant wedge. Motion of the movable face portion of the pad relative to the load applying or supporting surface under operational conditions, as described in that patent, causes the face portion to swing in minute amounts to an inclined position relative to the load applying or supporting surface under the combined influences of load and friction forces to produce a wedge-shaped gap that converges in the direction of motion of the load applying or supporting surface relative to the face portion of the pad. Multiple such bearing pads are normally provided in a typical bearing installation for supporting a relatively moving load applying or supporting member. Lubricant is drawn into the multiple gaps as a result of relative motion between the bearing surfaces and hydrodynamic action maintain the face portions of the pads and the adjacent relatively moving surface out of contact with each other virtually instantaneously upon onset of relative motion, and during the operation of the bearing.

The shape of the lubricant wedge associated with each bearing pad self-adjusts during operation of the bearing under varying load and speed conditions due to its unique design. Specifically, the face portion of each pad is joined to an underlying base element along an arcuate interface having a center of curvature located substantially at the desired center of swinging motion of the face portion. A curved, laminated, elastomer-nonelastomeric material is disposed between the face portion and the underlying base element of each pad, and is bonded on each side to both elements. The laminate material is compliant in the shear direction (parallel to the arcuate interface between the face portion and the underlying base element) but is essentially rigid in a radial sense (perpendicular to the arcuate interface). Therefore, the face portion of each bearing pad can readily and is actually forced to swing to a slightly inclined position about the center or axis of swing under the influence of friction and load forces applied to its surface by the load supporting member while still maintaining its basic position in the bearing assembly.

My earlier patent referenced above discloses radial and thrust bearing embodiments utilizing the swing pad concept. However, the present invention is intended to utilize the same principle in a combined radial and thrust bearing that utilizes compound curved bearing surfaces, the swing pad bearing overcoming problems encountered in the prior art in situations where it is desired to use such a bearing for supporting high radial loads.

More specifically, it is well known that the rotary part of plain journal radial bearings with lubricated continuous sliding surfaces actually runs slightly eccentric with respect to the longitudinal axis of the bearing, and this eccentricity permits the generation of a wedge of lubricant between the relatively moving bearing surfaces. The wedge of lubricant, through pressures generated by hydrodynamic action, in turn keeps the bearing surfaces apart so that surface-to-surface contact is avoided and frictional resistance to motion is minimized.

In situations where a sliding bearing having both radial and thrust capacity is desired, it has been proposed to use compound curved surfaces of various forms (e.g., a ball in a socket). The problem here is that the symmetrical compound curvature of the continuous bearing surfaces tends to prevent the moving element of the bearing from assuming its eccentric loaded rotating position at which the lubricant wedge is formed when the bearing is loaded in a thrust sense. The thrust bearing surface, being uniformly curved about the rotational axis, tends to hold the rotating element at the center of the bearing and therefore a radial load supporting lubricant which cannot be developed by the bearing because hydrodynamic pressures are not generated in the lubricant film to the extent necessary to keep the bearing surfaces apart.

A hydrodynamic tilting pad arrangement could be envisioned for such an application, but the required compound curvature of the bearing surface of the tilting pad, along with the variable nature of the radial and thrust loads, results in the position of the center of pressure acting on the tilting pad elements to be unpredictable. Since the center of pressure in a tilting pad bearing arrangement must be virtually in line with the tilt pivot point to prevent instability of the tilting segment of the bearing, clearly a tilting pad bearing has deficiencies which limit its application in a bearing of the type presently under consideration.

SUMMARY OF THE INVENTION

The present invention utilizes the principle of operation of the hydrodynamic swing pad bearing disclosed in the patent identified previously in a radial and thrust bearing construction using compound curved bearing surfaces that are arranged so that the bearing can accommodate misalignment between the moving parts. The face portion of the pads can swing about a point (swing center) under friction and load forces to enable generation of lubricant wedge films by the relative motion of the bearing surfaces. The relative position of the center of pressure acting on each bearing pad with respect to the face of the pad is uncritical within wide design limits, because friction and pressure forces acting on each pad stabilize the position of the face portion of the pad about its respective swing point to maintain the lubricant wedge during operation of the bearing.

Specifically, a cylindrical array or group of swing pad bearing elements is provided adjacent the spherical outer surface portion of a load applying or supporting member, the array of bearing pads and the load applying or supporting member being relatively rotatable with respect to each other about a longitudinal axis of rotation. The bearing surfaces of the face portions of the bearing pads correspond in curvature to the outer curvature of the load carrying part of the load applying or supporting member, and the bearing pad surfaces have centers of curvature that are common with each other and with the center of curvature of the bearing surface of the load applying or supporting member. The face portions of the pads are joined to supporting base elements along spherically curved interfaces, that limit motion of the face portion of the pads to swinging motion through an elastomer-inelastic laminate material that is relatively soft and compliant in the shear direction (parallel to the arcuate interface) but rigid in the radial direction (normal to the arcuate interface). The radius of curvature of the interface is shorter than the radius of curvature of the outer periphery of the load applying or supporting member, and likewise shorter than the radius of curvature of the bearing surface of the bearing pad.

Thus, the face portions of each bearing pad swing about a swing point or center that corresponds essentially to the center of curvature of the interface between the face portion of the pad and the underlying base element. The center of curvature of the interface of each pad assembly lies at a point located along the radius of the spherical bearing surface of the bearing pad, somewhere between the center of curvature of that surface and the surface itself, preferably approximately mid-way along the radius that intersects the pad surface, preferably at approximately its center. The center of swinging motion of the face portions of each group of bearing pads thus lie on radii extending between the common centers of curvature referred to above and the bearing surfaces of the pads. The elastomer-inelastic laminate moreover inherently provides an elastic restoring force tending to return the face portion of each pad to its at rest position, and prevents the pads from moving away from their supports when unloaded.

The bearing surfaces of the pads are immersed in a suitable lubricant so that when relatively motion occurs between the load applying or supporting member and the bearing pads, the face portions, under the influence of friction and load forces acting thereon, swing to dynamically stable positions in any direction to generate wedge-shaped lubricant film maintaining gaps between the relatively moving surfaces. Due to the arrangement of the mating spherical bearing surfaces, thrust loads as well as radial loads can be supported by the swing pads, and misalignment between the rotational axis of the load applying or supporting member and the longitudinal axis of the cylindrical array of bearing pads can be accommodated. The wedge-shaped lubricant films are maintained at all times regardless of the direction of loading of the bearing surfaces.

DETAILED DESCRIPTION OF A PREFERRED EMBODIMENT

Description of the Drawings

FIG. 1 is a diagrammatic plan view of part of a bearing assembly embodying my invention;

FIG. 2 is an elevational view taken generally along lines II—II of FIG. 1, with the central load supporting member removed for clarity;

FIG. 3 is an enlarged detail view of a bearing pad assembly; and

FIG. 4 is a diagrammatic representation of the bearing in operation.

DETAILED DESCRIPTION

With reference to the drawings, a bearing assembly 10 is shown in FIG. 1 connected to a load applying or supporting member 12 which extends along a longitudinal axis 14. The bearing assembly 10 includes an outer casing 16 and a set of connected base elements 18 which underlie a cylindrical array of face portions 20 of the bearing assembly spaced about the longitudinal axis 14. The connected base elements 18 preferably are constructed as a pair of split sleeves joined along lines 22 for enabling assembly of the bearing about the load applying or supporting member 12. Each face portion 20 is connected to its respective underlying base section 18 through an elastomeric-inelastic interface comprising, in the preferred mode, a metal-elastomer laminate, as shown in FIG. 3, where the metal layers are shown as 24 and the elastomeric layers, i.e., rubber, are shown as 26. The combination of the face portion 20, the underlying base element 18 and the intermediate laminate material 24, 26 is referred to herein as a bearing pad.

The base element 18 could be made up of individual segments (not illustrated) attached to a casing such as 16 connected to individual face portions 20 through individual laminations 24, 26. However, the illustrated embodiment shows a common member 18 having spaced curved interface areas for receiving individual face portions 20 and intermediate laminations 24, 26 bonded on either side to the face portions and the base element. The face portions 20 each have concave spherically curved bearing surfaces 30 that conform in curvature to a spherical portion 32 of the load applying or supporting member 12 (see FIG. 1). The surfaces 30 have a common center of curvature 33 lying on axis 14, and center 33 corresponds to the center of curvature of the peripheral surface portion 32 of member 12. The casing 16 and the bearing pads usually are held fixed against rotation and they support load member 12 for rotation about an axis generally coincidental with axis 14, in which case member 12 is a "load applying" member. However, it will be readily understood that this invention is not limited in any sense to such an arrangement, and member 12 could just as well be fixed for supporting load carrying bearing pads for rotation relative thereto about axis 14. Thus, the term "load applying or supporting member" with reference to member 12 is not intended to be an alternative recitation in the specification and claims constituting this application, but rather a singular expression relating to the structure corresponding to member 12, irrespective of its specific function in a particular application.

The surfaces 34 (see FIG. 1) of base elements 18 underlying each face portion 20 and the underlying surface 35 of each face portion 20 are called interface surfaces and are spherically curved about a center of curvature 40 located along a radius $R_1$ extending from the point 33 to the approximate center of bearing surface 30 of each face portion 20 of the bearing pads when the face portion is at its at rest position. Thus, for example, the radius $R_2$ of the surface 35 is shorter than the radius $R_1$ of the surface 30. The centers of curvature 40 of interfaces 34 and 35 of the bearing pads are disposed preferably about a locus that is equidistant from the axis of rotation 14, so that the radius $R_2$, for example, of each surface 35 is identical for all of the bearing pads, although this is not an absolute requirement. As illustrated, the surfaces 34 and 35 are curves that are concentric about point 40, which represents the swinging axis or swing center of each face portion 20 of the bearing pads. As shown, metal lamina 24 are likewise curved so that they are parallel to the surfaces 34 and 35.

Upon relative movement between member 12 and the face portions 20, the latter, because of friction forces, will immediately tend to swing about their respective swing axes 40 to an inclined position relative to the base 18 and the outer surface of the spherical portion 32, as shown in FIG. 4. The laminates 24, 26 being compliant in shear but substantially rigid in a radial sense readily accommodate the swinging motion of the face portions 20 of each pad while it positively restricts the freedom of motion of the face portion to swinging movement relative to the pad support in a plurality of directions about the swing center 40. In actuality, the swinging motion is quite miniscule so that the space between the load applying or supporting member 12 and the bearing pads is maintained despite the very slight swinging movement of each face portion 20. In addition, eccentric loads (non-radial to interface 34, 35) applied to the face portion 20 cause them to swing in a direction tending to cause the load vector to be radially aligned with the interface surface curvature. The total swinging motion is small and is always towards the adjacent bearing surface in the direction of swinging motion. Swinging motion stabilizes the face portion so that the net forces acting thereon are in balance continuously.

In FIG. 4, a fluid lubricant is provided between the load applying or supporting member portion 32 and the bearing pads so that a hydrodynamic lubricant wedge is maintained between the face portions 20 and the member 32 in the manner of a hydrodynamic fluid film bearing. Since the face portions 20 are supported upon spherical underlying surfaces, each face portion 20 can swing to a stable, balanced position under the combined radial and thrust components of friction and load forces. The ball joint-like relationship between spherical portion 32 of load applying or supporting member 12 and each bearing pad allows the bearing to handle thrust loads and to accommodate angular misalignment between the axis 14 of the cylindrical array of bearing pads and the longitudinal axis of load applying or supporting member 12. The latter axis, of course, will pass through point 33. It should be understood that the relative sizes of the thickness of the laminations 24, 26, as well as the wedge-shaped gaps 42 in FIG. 4 all have been exaggerated for the sake of clarity.

It is thus evident that the swing pad elements of the present invention will automatically swing to stable positions to generate wedge films of lubricant regardless of radial and thrust load forces. Radial loads cause the bearing surfaces to swing about their swing points in directions parallel to the direction of motion of the adjacent bearing surface of the load applying or supporting member, while thrust loads cause the movable bearing face elements to swing back towards the source of the thrust load so that the fluid film pressures between the moving surfaces are in balance. Most importantly, thrust loads do not disturb the ability of the bearing to generate the desired lubricant wedge.

Various modifications of the illustrated embodiment of the invention are possible, and only an exemplary, presently preferred construction has been disclosed. Likewise, the construction of the load applying or supporting member 12 could be varied in numerous manners while still providing a spherical portion 32 adjacent the cylindrical array of bearing pads. It is furthermore envisioned that multiple circular arrays of bearing pads could be provided about a single spherical load supporting member portion 32 or a single set of pads could be located in an area other than about a diameter of the spherical portion of the member 32. More laminations 24, 26 could be provided in the interface area. However, all of these modifications are envisioned as being fully within the scope of my invention disclosed in the present application, which invention is to be limited only by the scope of the claims appended hereto.

What is claimed is:

1. A fluid film bearing assembly comprising:
   (a) a plurality of bearing pads disposed in a cylindrical array disposed about a longitudinal axis;
   (b) pad support areas located beneath each pad;
   (c) the bearing pads each comprising:
      (i) a face portion having a curved bearing surface facing generally towards said axis, and a spherically curved rear surface facing a concentric surface of a respective bearing support area, the concentric surfaces defining interface surfaces having a center of curvature located between said axis and said bearing surface;
      (ii) alternate layers of laminated elastomer-inelastic material between and coextensive with the interface surfaces, the material being bonded to the interface surfaces and being compliant in directions along the interface surfaces but rigid in a radial sense with respect thereto, so that the face portion is supported upon and secured to a respective pad support area by said material in a manner that positively restricts the freedom of motion of said face portion to swinging movement relative to the pad support area in a plurality of directions about a swing center corresponding to said center of curvature during bearing operation, and said material provides an elastic restoring force that resists such swinging movement; and
   (d) the bearing surfaces of the pads having a common center of curvature located on said longitudinal axis.

2. The bearing assembly according to claim 1, wherein the centers of curvature of the said interface surfaces are equidistant from said longitudinal axis.

3. The bearing assembly according to claim 1, wherein the center of curvature of each set of interface surfaces lies along a radius line extending from said common center of curvature of the bearing surfaces to the approximate center of each bearing surface when said face portion is in its at rest position.

4. The bearing assembly according to claim 1, including a load applying or supporting member extending along said longitudinal axis and within said cylindrical group of bearing pads, said load applying or supporting member having a continuous spherically curved peripheral bearing surface that is curved to conform to the curvature of the bearing surfaces of the bearing pads, said continuous bearing surface of the load applying or supporting member being adjacent the bearing surfaces of the bearing pads, said group of bearing pads and said load applying or supporting member being movable relative to each other about said longitudinal axis.

5. The bearing assembly according to claim 4, including a fluid lubricant about the adjacent bearing surfaces, whereby friction forces generated by the relative motion between said load applying or supporting member and the bearing pads cause the face portions of the bearing pads to swing to inclined positions creating wedge-shaped lubricant films between the bearing surfaces, the wedge films converging in the direction of motion of the continuous bearing surfaces relative to the face portions of the bearing pads.

* * * * *